US012633448B2

(12) United States Patent
Nagai et al.

(10) Patent No.: US 12,633,448 B2
(45) Date of Patent: May 19, 2026

(54) COIL COMPONENT AND METHOD FOR MANUFACTURING COIL COMPONENT

(71) Applicant: TDK CORPORATION, Tokyo (JP)

(72) Inventors: Yusuke Nagai, Tokyo (JP); Kazuhiro Ebina, Tokyo (JP); Takahiro Sato, Tokyo (JP); Kunihiko Kawasaki, Tokyo (JP); Shinichi Sato, Tokyo (JP); Seiichi Nakagawa, Tokyo (JP); Kouichi Kakuda, Tokyo (JP); Yuya Ishima, Tokyo (JP); Mitsuru Ito, Tokyo (JP)

(73) Assignee: TDK CORPORATION, Tokyo (JP)

( * ) Notice: Subject to any disclaimer, the term of this patent is extended or adjusted under 35 U.S.C. 154(b) by 802 days.

(21) Appl. No.: 17/939,036

(22) Filed: Sep. 7, 2022

(65) Prior Publication Data

US 2023/0070168 A1 Mar. 9, 2023

(30) Foreign Application Priority Data

Sep. 9, 2021 (JP) ................................ 2021-146985

(51) Int. Cl.
*H01F 27/29* (2006.01)

(52) U.S. Cl.
CPC ................................ *H01F 27/292* (2013.01)

(58) Field of Classification Search
CPC ..... H01F 27/292; H01F 17/04; H01F 17/0013
USPC ........................................................ 336/192
See application file for complete search history.

(56) References Cited

U.S. PATENT DOCUMENTS

2020/0115275 A1 4/2020 Awagakubo et al.
2020/0395167 A1* 12/2020 Haseyama ............ H01F 41/046

FOREIGN PATENT DOCUMENTS

JP H08162357 A * 6/1996
JP H08203770 A * 8/1996
JP 2018-190490 A 11/2018

* cited by examiner

*Primary Examiner* — Tuyen T Nguyen
(74) *Attorney, Agent, or Firm* — Oliff PLC

(57) ABSTRACT

A multilayer coil component includes: an element body; a coil disposed in the element body; and a first external electrode disposed on a surface of the element body in which the first external electrode has a first electrode layer disposed on the surface of the element body and a first plating layer and a second plating layer disposed on the first electrode layer, and the first plating layer and the second plating layer are disposed so as to be scattered in a plurality of places on an edge of the first electrode layer.

5 Claims, 7 Drawing Sheets

COIL COMPONENT AND METHOD FOR MANUFACTURING COIL COMPONENT

TECHNICAL FIELD

The present invention relates to a coil component and a method for manufacturing a coil component.

BACKGROUND

Patent Literature 1 (Japanese Unexamined Patent Publication No. 2018-190490) discloses an electronic component including a ceramic multilayer body, an internal electrode layer disposed in the ceramic multilayer body, and an external electrode disposed on the surface of the ceramic multilayer body. In the electronic component described in Patent Literature 1, the external electrode has an external electrode layer disposed on the surface of the ceramic multilayer body and a plating layer disposed on the external electrode layer.

In manufacturing a coil component in which an external electrode has an electrode layer and a plating layer, the plating layer is formed on the electrode layer after the electrode layer is formed on an element body. In forming the plating layer, the edge of the electrode layer formed on the surface of the element body may peel off due to the stress that is generated during the plating layer formation.

SUMMARY

An object of one aspect of the present invention is to provide a coil component and a method for manufacturing a coil component capable of suppressing peeling of an external electrode.

A coil component according to one aspect of the present invention includes: an element body; a coil disposed in the element body; and an external electrode disposed on a surface of the element body, in which the external electrode has a first electrode layer disposed on the surface of the element body and a plating layer disposed on the first electrode layer, and the plating layer is disposed so as to be scattered in a plurality of places on an edge of the first electrode layer.

In the coil component according to one aspect of the present invention, the plating layer is disposed so as to be scattered in a plurality of places on the edge of the first electrode layer. In this manner, in the coil component, the plating layer is disposed so as to be scattered in a plurality of places not at the edge of the first electrode layer as a whole but on the edge of the first electrode layer, and thus the stress that is generated when the plating layer is formed can be dispersed. Accordingly, in the coil component, the first electrode layer peeling off the element body can be suppressed. Accordingly, in the coil component, peeling of the external electrode can be suppressed.

In one embodiment, the external electrode may have a second electrode layer disposed on the first electrode layer, the second electrode layer may contain a resin and may not be disposed at the edge of the first electrode layer, and the plating layer may be disposed on the first electrode layer and the second electrode layer. In this configuration, the edge of the first electrode layer is not covered with the second electrode layer, and thus the plating layer is disposed so as to be scattered in a plurality of places on the edge of the first electrode layer. Accordingly, the first electrode layer peeling off the element body can be suppressed. In addition, the second electrode layer contains a resin. As a result, in the second electrode layer, the stress in forming the plating layer can be mitigated. Accordingly, it is possible to suppress the second electrode layer peeling off the first electrode layer due to the stress in forming the plating layer.

In one embodiment, the external electrode may have a second electrode layer disposed on the first electrode layer, the second electrode layer may have no glass component on a surface as compared with the first electrode layer and may not be disposed at the edge of the first electrode layer, and the plating layer may be disposed on the first electrode layer and the second electrode layer. In this configuration, the edge of the first electrode layer is not covered with the second electrode layer, and thus the plating layer is disposed so as to be scattered in a plurality of places on the edge of the first electrode layer. Accordingly, the first electrode layer peeling off the element body can be suppressed. In addition, the second electrode layer has no glass component on the surface as compared with the first electrode layer. Accordingly, the plating layer can be continuously and uniformly formed on the second electrode layer.

In one embodiment, the element body may be configured by stacking a magnetic body layer containing a plurality of metal magnetic particles of a soft magnetic material.

A method for manufacturing a coil component according to one aspect of the present invention is a method for manufacturing a coil component including an element body, a coil disposed in the element body, and an external electrode disposed on a surface of the element body, in which an electrode layer disposed on the surface of the element body and a plating layer disposed on the electrode layer are provided, and the plating layer is formed on an edge of the electrode layer such that the plating layer is scattered in a plurality of places.

In the coil component manufacturing method according to one aspect of the present invention, the plating layer is formed on the edge of the electrode layer such that the plating layer is scattered in a plurality of places. In this manner, in the coil component manufacturing method, the plating layer is formed so as to be scattered in a plurality of places not at the edge of the electrode layer as a whole but on the edge of the first electrode layer, and thus the stress that is generated when the plating layer is formed can be dispersed. Accordingly, in the coil component manufacturing method, the electrode layer peeling off the element body can be suppressed. Accordingly, in the coil component manufacturing method, peeling of the external electrode can be suppressed in the coil component.

According to one aspect of the present invention, peeling of the external electrode can be suppressed.

DETAILED DESCRIPTION

Figure 1:
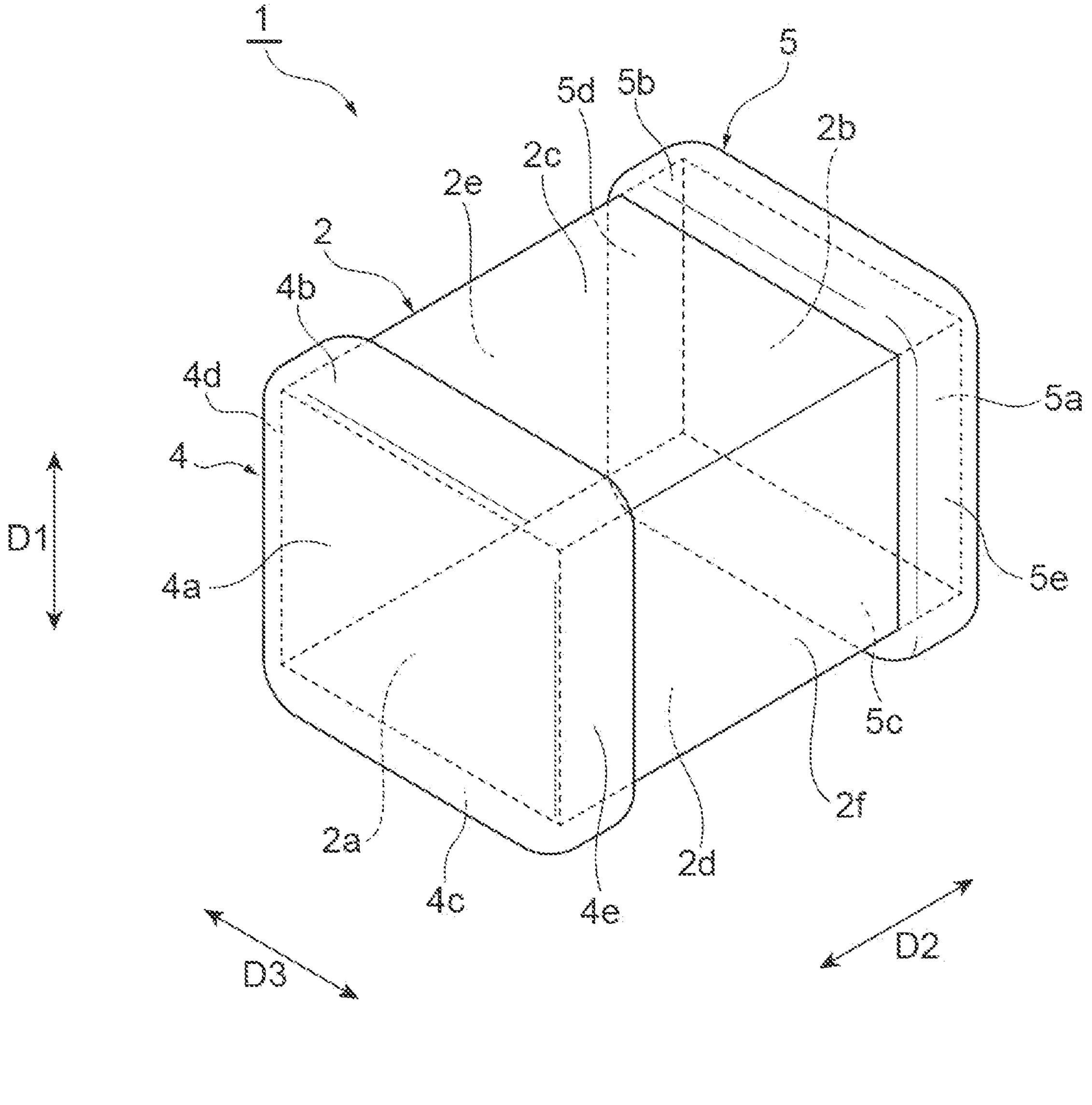
FIG. 1 is a perspective view illustrating a multilayer coil component according to one embodiment.

Hereinafter, a preferred embodiment of the present invention will be described in detail with reference to the accompanying drawings. It should be noted that in the description of the drawings, the same or equivalent elements are denoted by the same reference numerals with redundant description omitted.

As illustrated in FIG. 1, a multilayer coil component 1 includes an element body 2 and a first external electrode 4 and a second external electrode 5 respectively disposed on both end portions of the element body 2.

The element body 2 has a rectangular parallelepiped shape. The rectangular parallelepiped shape includes the shape of a rectangular parallelepiped with chamfered corner and ridge portions and the shape of a rectangular parallelepiped with rounded corner and ridge portions. The element body 2 has, as the outer surfaces thereof, a pair of end surfaces 2*a* and 2*b* facing each other, a pair of main surfaces 2*c* and 2*d* facing each other, and a pair of side surfaces 2*e* and 2*f* facing each other. The facing direction in which the pair of main surfaces 2*c* and 2*d* face each other is a first direction D1. The facing direction in which the pair of end surfaces 2*a* and 2*b* face each other is a second direction D2. The facing direction in which the pair of side surfaces 2*e* and 2*f* face each other is a third direction D3. In the present embodiment, the first direction D1 is the height direction of the element body 2. The second direction D2 is the longitudinal direction of the element body 2 and is orthogonal to the first direction D1. The third direction D3 is the width direction of the element body 2 and is orthogonal to the first direction D1 and the second direction D2.

The pair of end surfaces 2*a* and 2*b* extend in the first direction D1 so as to interconnect the pair of main surfaces 2*c* and 2*d*. The pair of end surfaces 2*a* and 2*b* also extend in the third direction D3 (short side direction of the pair of main surfaces 2*c* and 2*d*). The pair of side surfaces 2*e* and 2*f* extend in the first direction D1 so as to interconnect the pair of main surfaces 2*c* and 2*d*. The pair of side surfaces 2*e* and 2*f* also extend in the second direction D2 (long side direction of the pair of end surfaces 2*a* and 2*b*). The main surface 2*d* can be defined as a mounting surface facing another electronic device when the multilayer coil component 1 is mounted on the electronic device (for example, a circuit board or an electronic component).

Figure 3:
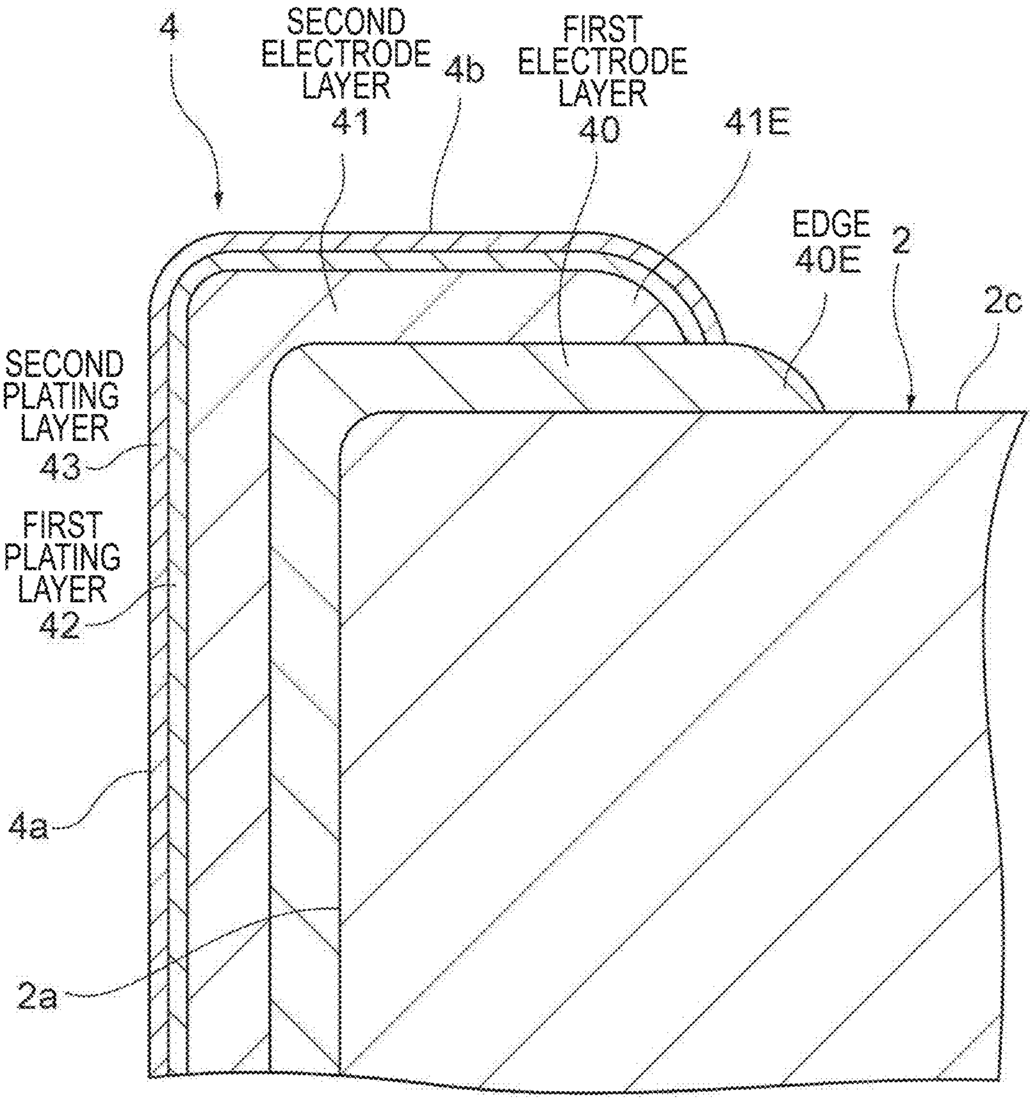
FIG. 3 is a partially enlarged cross-sectional view illustrating a first external electrode.

As illustrated in FIG. 3, the element body 2 is configured by stacking a plurality of magnetic body layers 6. Each magnetic body layer 6 is stacked in the first direction D1. In other words, the first direction D1 is the stacking direction. The element body 2 has the plurality of magnetic body layers 6 that are stacked. In the actual element body 2, the plurality of magnetic body layers 6 are integrated to the extent that the boundary between the layers cannot be visually recognized.

Each magnetic body layer 6 contains a plurality of metal magnetic particles. The metal magnetic particles are configured from a soft magnetic alloy (soft magnetic material). The soft magnetic alloy is, for example, a Fe—Si-based alloy. In a case where the soft magnetic alloy is a Fe—Si-based alloy, the soft magnetic alloy may contain P. The soft magnetic alloy may be, for example, a Fe—Ni—Si-M-based alloy. "M" contains one or more elements selected from Co, Cr, Mn, P, Ti, Zr, Hf, Nb, Ta, Mo, Mg, Ca, Sr, Ba, Zn, B, Al, and rare-earth elements.

The metal magnetic particles are bonded to each other in the magnetic body layer 6. The bond between the metal magnetic particles is realized by, for example, the bond between the oxide films formed on the surfaces of the metal magnetic particles. In the magnetic body layer 6, the metal magnetic particles are electrically insulated from each other by the bond between the oxide films. The thickness of the oxide film is, for example, 5 to 60 nm or less. The oxide film may be configured by one or more layers.

The element body 2 contains a resin. The resin is present between the plurality of metal magnetic particles. The resin is an electrically insulating resin (insulating resin). The insulating resin includes, for example, a silicone resin, a phenol resin, an acrylic resin, or an epoxy resin.

As illustrated in FIG. 1, the first external electrode 4 is disposed on the end surface 2*a* side of the element body 2, and the second external electrode 5 is disposed on the end surface 2*b* side of the element body 2. In other words, the first external electrode 4 and the second external electrode 5 are positioned apart from each other in the facing direction of the pair of end surfaces 2*a* and 2*b*.

The first external electrode 4 is disposed on one end surface 2*a* side. The first external electrode 4 includes the five electrode parts of a first electrode part 4*a* positioned on the end surface 2*a*, a second electrode part 4*b* positioned on the main surface 2*c*, a third electrode part 4*c* positioned on the main surface 2*d*, a fourth electrode part 4*d* positioned on the side surface 2*e*, and a fifth electrode part 4*e* positioned on the side surface 2*f*. The first electrode part 4*a* and the second electrode part 4*b*, the third electrode part 4*c*, the fourth electrode part 4*d*, and the fifth electrode part 4*e* are connected in the ridge portion of the element body 2 and are electrically interconnected. The first external electrode 4 is formed on the five surfaces of one end surface 2*a*, the pair of main surfaces 2*c* and 2*d*, and the pair of side surfaces 2*e* and 2*f*. The first electrode part 4*a*, the second electrode part 4*b*, the third electrode part 4*c*, the fourth electrode part 4*d*, and the fifth electrode part 4*e* are integrally formed.

As illustrated in FIG. 3, the first external electrode 4 has a first electrode layer 40, a second electrode layer 41, a first plating layer 42, and a second plating layer 43.

The first electrode layer 40 is formed on the five surfaces of one end surface 2*a*, the pair of main surfaces 2*c* and 2*d*, and the pair of side surfaces 2*e* and 2*f*. The first electrode layer 40 contains a conductive material (for example, Ag or Pd). The first electrode layer 40 is configured as a sintered body of a conductive paste containing a conductive metal powder (for example, Ag powder or Pd powder) and glass frit.

The second electrode layer 41 is formed on the first electrode layer 40. The second electrode layer 41 is disposed on the first electrode layer 40 formed on the five surfaces of one end surface 2*a*, the pair of main surfaces 2*c* and 2*d*, and the pair of side surfaces 2*e* and 2*f*. The second electrode layer 41 is a conductive resin layer. A thermosetting resin mixed with, for example, a conductive material and an organic solvent is used as the conductive resin. A conductive filler or the like is used as the conductive material. The conductive filler is a metal powder. Ag powder or the like is used as the metal powder. A phenol resin, an acrylic resin, a silicone resin, an epoxy resin, a polyimide resin, or the like is used as the thermosetting resin.

The first plating layer 42 is disposed so as to cover a part of the first electrode layer 40 and the second electrode layer 41. The first plating layer 42 is formed on the five surfaces of one end surface 2*a*, the pair of main surfaces 2*c* and 2*d*, and the pair of side surfaces 2*e* and 2*f*. The first plating layer 42 is a Ni plating layer formed by Ni plating.

The second plating layer 43 is disposed so as to cover the first plating layer 42. The second plating layer 43 is formed on the five surfaces of one end surface 2*a*, the pair of main surfaces 2*c* and 2*d*, and the pair of side surfaces 2*e* and 2*f*. The second plating layer 43 is a Sn plating layer formed by Sn plating.

In the first external electrode 4, the second electrode layer 41 is not disposed on an edge 40E of the first electrode layer 40. In other words, the edge 40E of the first electrode layer 40 is not covered with the second electrode layer 41. The edge 40E of the first electrode layer 40 is positioned closer to the middle side (inside) of the element body 2 in the second direction D2 than the second electrode layer 41. The edge 40E of the first electrode layer 40 protrudes to the end surface 2*b* side of the element body 2 beyond the second electrode layer 41 in the second direction D2. In other words, an edge 41E of the second electrode layer 41 is retracted to the end surface 2*a* side of the element body 2 beyond the edge 40E of the first electrode layer 40 in the second direction D2. The edge 40E of the first electrode layer 40 is a part that includes the tip on the end surface 2*b* side of the element body 2 and is exposed without being covered with the second electrode layer 41. For example, the edge 40E of the first electrode layer 40 is the part of approximately ¼ of the length in the second direction D2 of the first electrode layer 40 disposed on the main surface 2*c* of the element body 2. It should be noted that although FIG. 3 illustrates the first electrode layer 40 and the second electrode layer 41 on the main surface 2*c* of the element body 2, the main surface 2*d* and the side surfaces 2*e* and 2*f* are similar in configuration.

Figure 4:
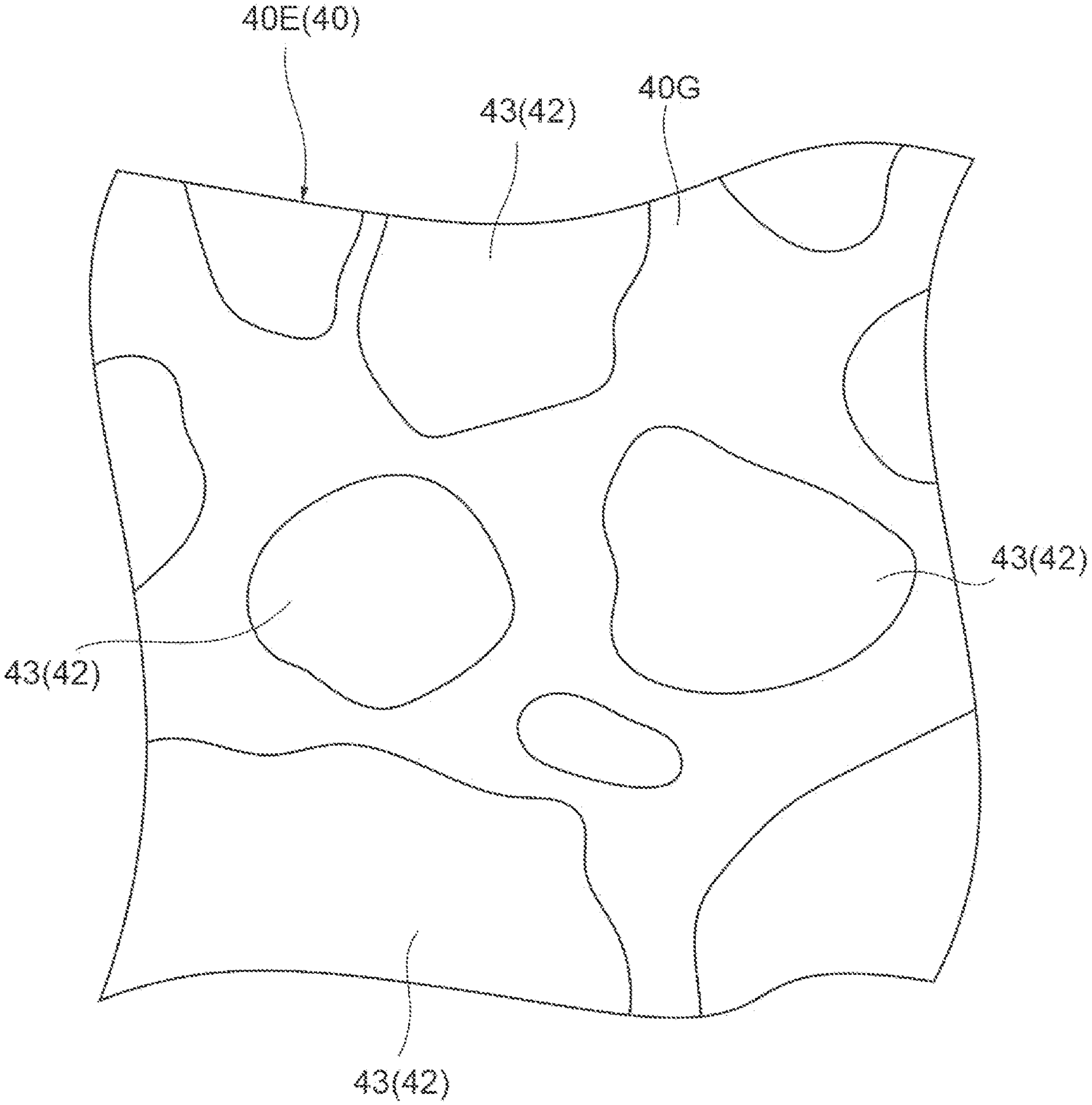
FIG. 4 is a diagram schematically illustrating a plating layer disposed at an edge of a first electrode layer of the first external electrode.

The first plating layer 42 and the second plating layer 43 are disposed on a part of the edge 40E of the first electrode layer 40. In other words, the first plating layer 42 and the second plating layer 43 are not disposed on a part of the edge 40E of the first electrode layer 40. As illustrated in FIG. 4, the second plating layer 43 (first plating layer 42) is disposed so as to be scattered in a plurality of places. The second plating layers 43 (first plating layers 42) are scattered independently of each other. The mutual independence means formation with a mutual boundary as an appearance and does not mean electrical independence. It can be said that the second plating layer 43 (first plating layer 42) is discontinuously disposed at the edge 40E of the first electrode layer 40. It can be said that the second plating layer 43 (first plating layer 42) is scattered in an island shape. At the edge 40E of the first electrode layer 40, a glass layer 40G is provided on the surface of the region where the second plating layer 43 (first plating layer 42) is not disposed (a glass component is present). In other words, the second plating layer 43 (first plating layer 42) is not disposed on the glass layer 40G.

Figure 5:
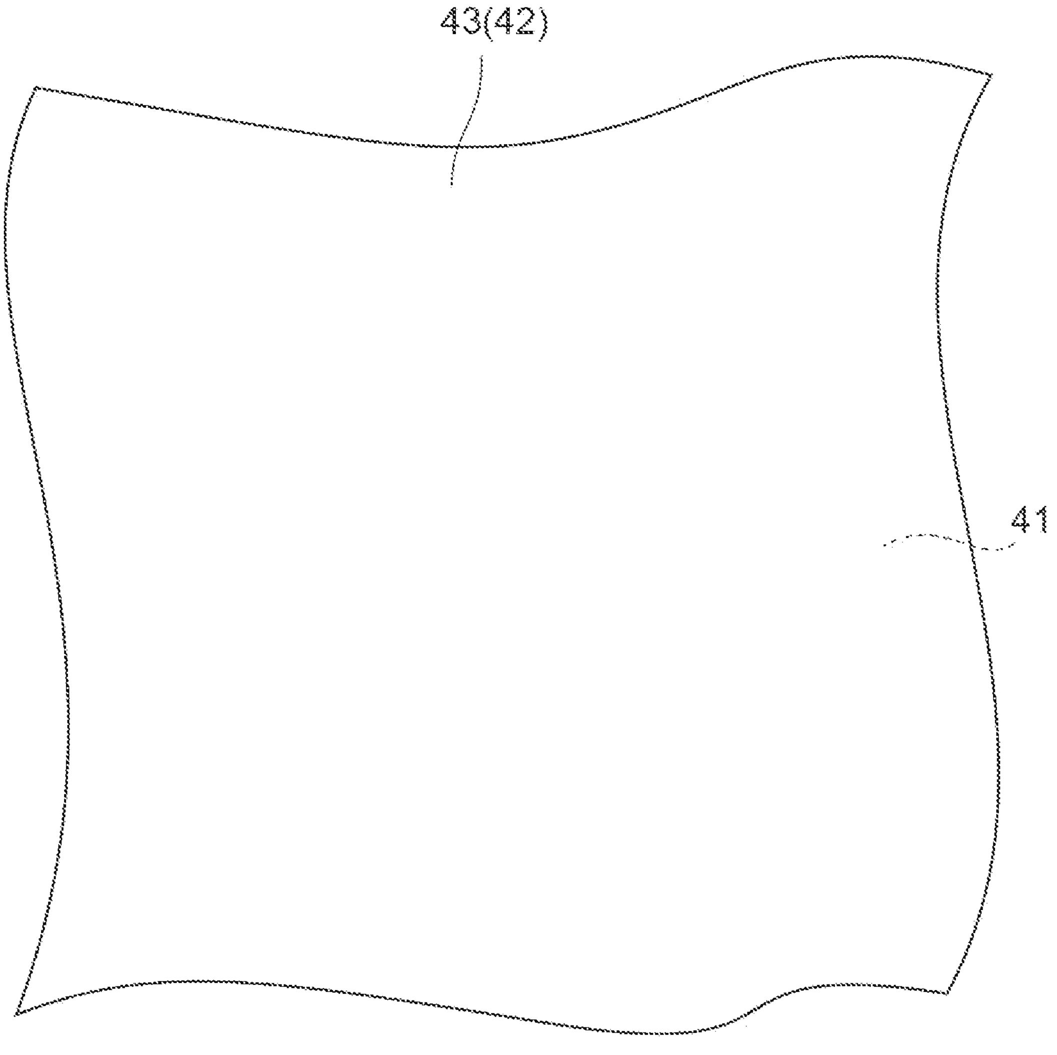
FIG. 5 is a diagram schematically illustrating a plating layer disposed at an edge of a second electrode layer of the first external electrode.

The first plating layer 42 and the second plating layer 43 are disposed on the second electrode layer 41. As illustrated in FIG. 5, the second plating layer 43 (first plating layer 42) is continuously and uniformly formed on the second electrode layer 41. Although a resin can be deposited on the surface of the second electrode layer 41 as well, the region (area) of the resin is smaller than that of the glass layer 40G and is present substantially uniformly on the surface of the second electrode layer 41, and thus the inter-resin distance is short.

Accordingly, on the second electrode layer 41, even if a resin is deposited, the second electrode layer 41 is formed so as to cover the resin so as to be spread over (bridge) the part where the resin is not deposited. As a result, the first plating layer 42 and the second plating layer 43 are continuously and uniformly formed on the second electrode layer 41.

The first electrode layer 40 and the second electrode layer 41 are joined with a predetermined strength by the anchor effect attributable to the unevenness of the boundary between the first electrode layer 40 and the second electrode layer 41.

As illustrated in FIG. 1, the second external electrode 5 is disposed on the other end surface 2*b* side. The second external electrode 5 includes the five electrode parts of a first electrode part 5*a* positioned on the end surface 2*b*, a second electrode part 5*b* positioned on the main surface 2*c*, a third electrode part 5*c* positioned on the main surface 2*d*, a fourth electrode part 5*d* positioned on the side surface 2*e*, and a fifth electrode part 5*e* positioned on the side surface 2*f*. The first electrode part 5*a* and the second electrode part 5*b*, the third electrode part 5*c*, the fourth electrode part 5*d*, and the fifth electrode part 5*e* are connected in the ridge portion of the element body 2 and are electrically interconnected. The second external electrode 5 is formed on the five surfaces of one end surface 2*b*, the pair of main surfaces 2*c* and 2*d*, and the pair of side surfaces 2*e* and 2*f*. The first electrode part 5*a*, the second electrode part 5*b*, the third electrode part 5*c*, the fourth electrode part 5*d*, and the fifth electrode part 5*e* are integrally formed.

Figure 6:
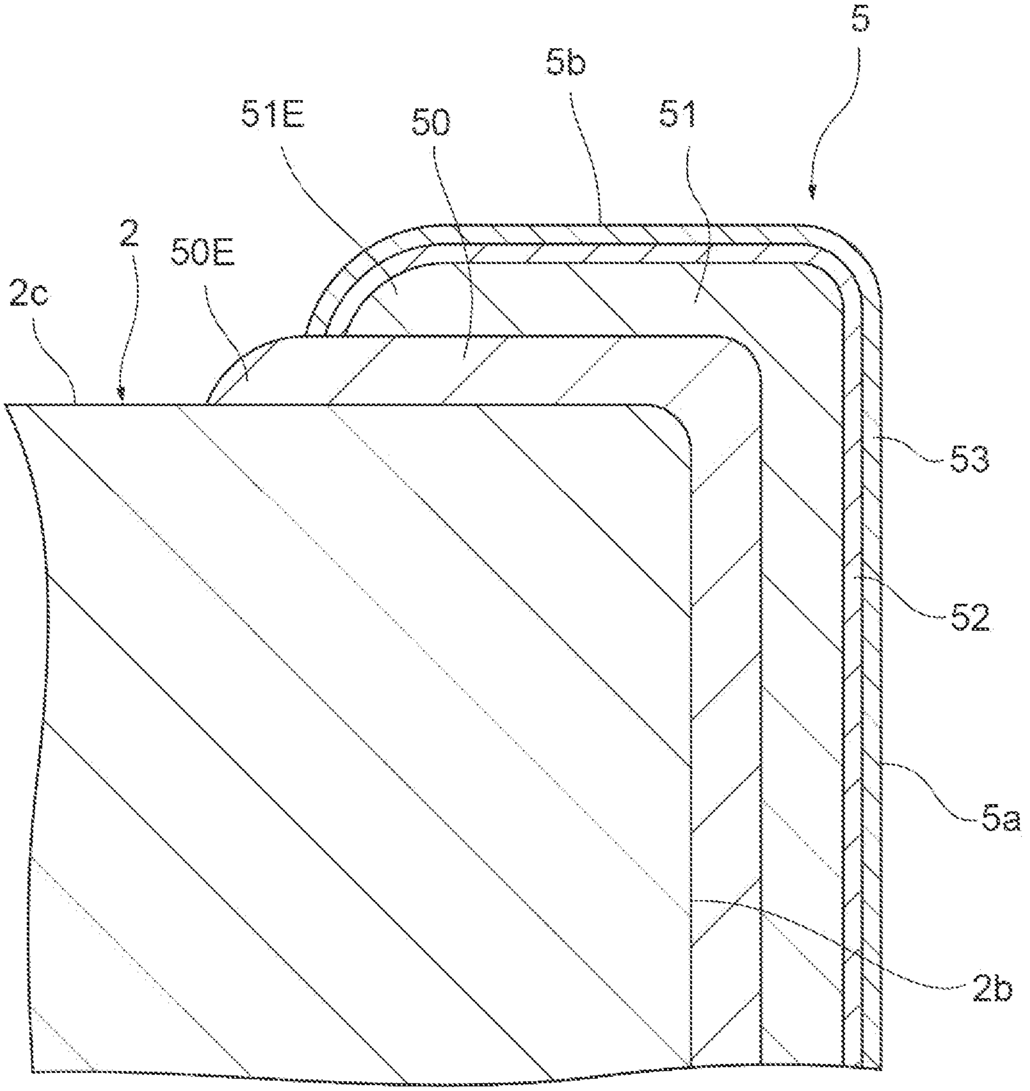
FIG. 6 is a partially enlarged cross-sectional view illustrating a second external electrode.

As illustrated in FIG. 6, the second external electrode 5 has a first electrode layer 50, a second electrode layer 51, a first plating layer 52, and a second plating layer 53.

The first electrode layer 50 is formed on the five surfaces of one end surface 2*b*, the pair of main surfaces 2*c* and 2*d*, and the pair of side surfaces 2*e* and 2*f*. The first electrode layer 50 contains a conductive material (for example, Ag or Pd). The first electrode layer 50 is configured as a sintered body of a conductive paste containing a conductive metal powder (for example, Ag powder or Pd powder) and glass frit.

The second electrode layer 51 is formed on the first electrode layer 50. The second electrode layer 51 is disposed on the first electrode layer 50 formed on the five surfaces of one end surface 2*b*, the pair of main surfaces 2*c* and 2*d*, and the pair of side surfaces 2*e* and 2*f*. The second electrode layer 51 is a conductive resin layer. A thermosetting resin mixed with, for example, a conductive material and an organic solvent is used as the conductive resin. A conductive filler or the like is used as the conductive material. The conductive filler is a metal powder. Ag powder or the like is used as the metal powder. A phenol resin, an acrylic resin, a silicone resin, an epoxy resin, a polyimide resin, or the like is used as the thermosetting resin.

The first plating layer 52 is disposed so as to cover a part of the first electrode layer 50 and the second electrode layer 51. The first plating layer 52 is formed on the five surfaces of one end surface 2*b*, the pair of main surfaces 2*c* and 2*d*, and the pair of side surfaces 2*e* and 2*f*. The first plating layer 52 is a Ni plating layer formed by Ni plating.

The second plating layer 53 is disposed so as to cover the first plating layer 52. The second plating layer 53 is formed on the five surfaces of one end surface 2*b*, the pair of main surfaces 2*c* and 2*d*, and the pair of side surfaces 2*e* and 2*f*. The second plating layer 53 is a Sn plating layer formed by Sn plating.

In the second external electrode 5, the second electrode layer 51 is not disposed on an edge 50E of the first electrode layer 50. In other words, the edge 50E of the first electrode layer 50 is not covered with the second electrode layer 51. The edge 50E of the first electrode layer 50 is positioned closer to the middle side (inside) of the element body 2 in the second direction D2 than the second electrode layer 51. The edge 50E of the first electrode layer 50 protrudes to the end surface 2*a* side of the element body 2 beyond the second electrode layer 51 in the second direction D2. In other words, an edge 51E of the second electrode layer 51 is retracted to the end surface 2*b* side of the element body 2 beyond the edge 50E of the first electrode layer 50 in the second direction D2. The edge 50E of the first electrode layer 50 is a part that includes the tip on the end surface 2*a* side of the element body 2 and is exposed without being covered with the second electrode layer 51. For example, the edge 50E of the first electrode layer 50 is the part of approximately ¼ of the length in the second direction D2 of the first electrode layer 50 disposed on the main surface 2*c* of the element body 2. It should be noted that although FIG. 6 illustrates the first electrode layer 50 and the second electrode layer 51 on the main surface 2*c* of the element body 2, the main surface 2*d* and the side surfaces 2*e* and 2*f* are similar in configuration.

Figure 7:
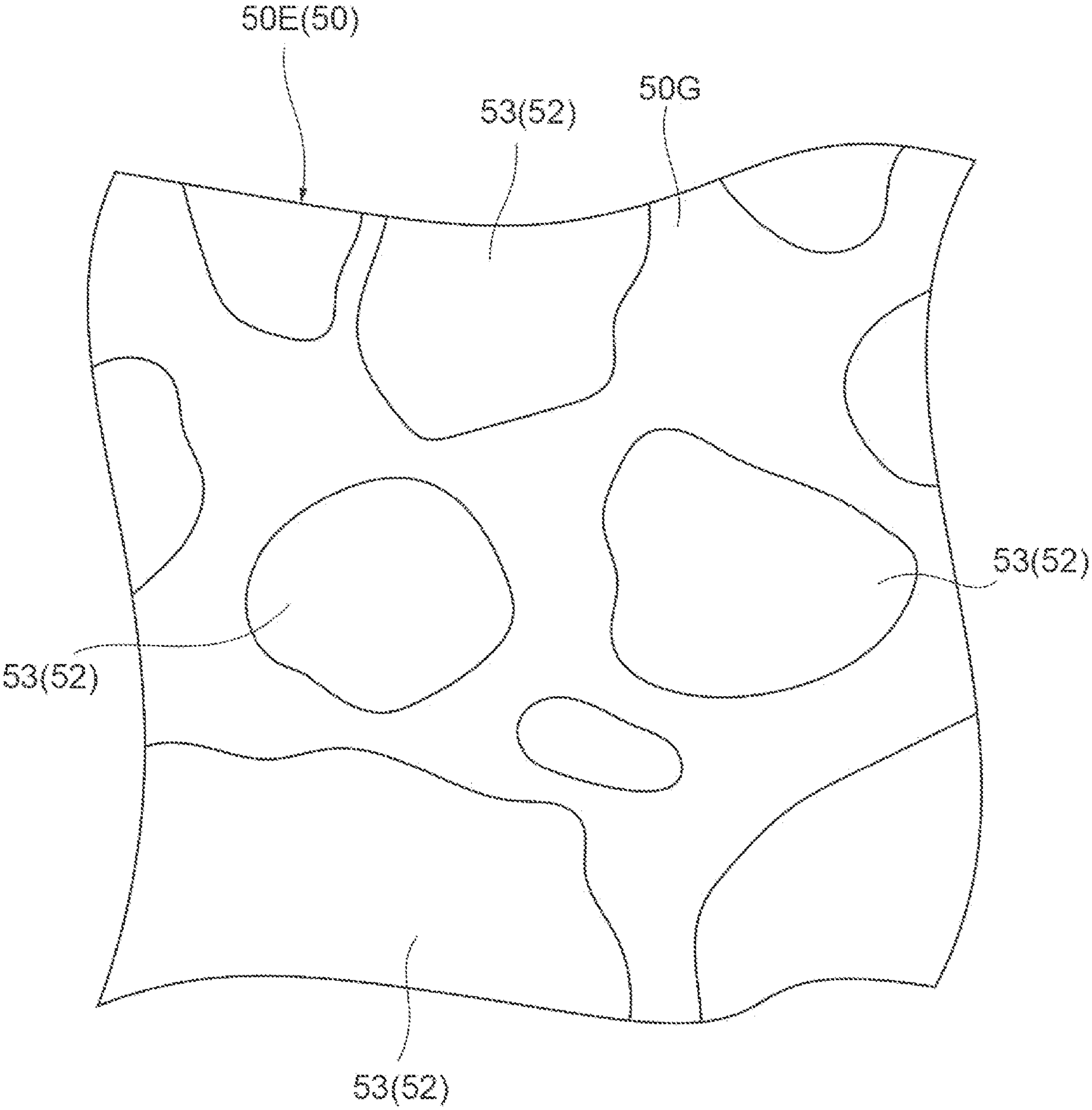
FIG. 7 is a diagram schematically illustrating a plating layer disposed at an edge of a first electrode layer of the second external electrode.

The first plating layer 52 and the second plating layer 53 are disposed on a part of the edge 50E of the first electrode layer 50. In other words, the first plating layer 52 and the second plating layer 53 are not disposed on a part of the edge 50E of the first electrode layer 50. As illustrated in FIG. 7, the second plating layer 53 (first plating layer 52) is disposed so as to be scattered in a plurality of places on the edge 50E of the first electrode layer 50. The second plating layers 53 (first plating layers 52) are scattered independently of each other. The mutual independence means formation with a mutual boundary as an appearance and does not mean electrical independence. It can be said that the second plating layer 53 (first plating layer 52) is discontinuously disposed at the edge 50E of the first electrode layer 50. It can be said that the second plating layer 53 (first plating layer 52) is scattered in an island shape. At the edge 50E of the first electrode layer 50, a glass layer 50G is provided on the surface of the region where the second plating layer 53 (first plating layer 52) is not disposed. In other words, the second plating layer 53 (first plating layer 52) is not disposed on the glass layer 50G.

The first plating layer 52 and the second plating layer 53 are disposed on the second electrode layer 51. The first plating layer 52 and the second plating layer 53 are continuously and uniformly formed on the second electrode layer 51. Although a resin can be deposited on the surface of the second electrode layer 51 as well, the region (area) of the resin is smaller than that of the glass layer 50G and is present substantially uniformly on the surface of the second electrode layer 51, and thus the inter-resin distance is short. Accordingly, on the second electrode layer 51, even if a resin is deposited, the second electrode layer 51 is formed so as to cover the resin so as to be spread over (bridge) the part where the resin is not deposited. As a result, the first plating layer 52 and the second plating layer 53 are continuously and uniformly formed on the second electrode layer 51.

The first electrode layer 50 and the second electrode layer 51 are joined with a predetermined strength by the anchor effect attributable to the unevenness of the boundary between the first electrode layer 50 and the second electrode layer 51.

Figure 2:
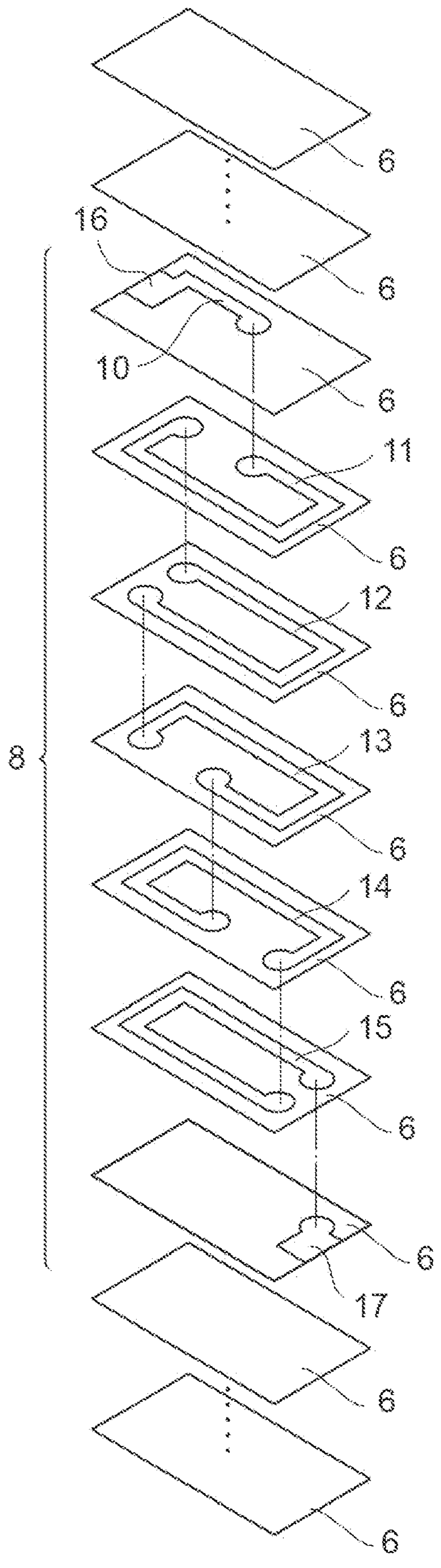
FIG. 2 is an exploded perspective view of the multilayer coil component illustrated in FIG. 1.

In the multilayer coil component 1, a coil 8 is disposed in the element body 2 as illustrated in FIG. 2. The coil 8 is configured in a spiral shape with a plurality of coil conductors 10, 11, 12, 13, 14, and 15 and a first connecting conductor 16 and a second connecting conductor 17 electrically connected. The adjacent coil conductors 10, 11, 12, 13, 14, and 15 are electrically connected by a through hole conductor (not illustrated). The coil conductor 15 and the second connecting conductor 17 are electrically connected by a through hole conductor (not illustrated). The first connecting conductor 16 configures one end portion of the coil 8. The first connecting conductor 16 is exposed on the end surface 2*a* of the element body 2 and is connected to the first external electrode 4 (first electrode part 4*a*). The second connecting conductor 17 configures the other end portion of the coil 8. The second connecting conductor 17 is exposed on the end surface 2*b* of the element body 2 and is connected to the second external electrode 5 (first electrode part 5*a*).

The coil conductors 10, 11, 12, 13, 14, and 15, the first connecting conductor 16, and the second connecting conductor 17 are made of a conductive material usually used as a conductor of a coil (for example, Ni or Cu). The coil conductors 10, 11, 12, 13, 14, and 15, the first connecting conductor 16, and the second connecting conductor 17 are configured as a sintered body of a conductive paste containing the above conductive material.

A method for manufacturing the multilayer coil component 1 will be described below.

Slurry is prepared by mixing, for example, metal magnetic particles, an insulating resin, and a solvent. The prepared slurry is applied onto a base material (such as a PET film) by the doctor blade method to form a green sheet to become the magnetic body layer 6. Next, a through hole is formed by laser machining at the position on the green sheet where a through hole conductor is to be formed.

Subsequently, the through hole in the green sheet is filled with a first conductive paste. The first conductive paste is prepared by mixing, for example, a conductive metal powder and a binder resin. Subsequently, conductors to become the coil conductors 10, 11, 12, 13, 14, and 15, the first connecting conductor 16, and the second connecting conductor 17 are provided on the green sheet. At this time, the conductor is connected to the conductive paste in the through hole.

Subsequently, the green sheet is stacked. Here, a plurality of the conductor-including green sheets are peeled off the base material, stacked, and pressurized in the stacking direction to form a multilayer body. At this time, each green sheet is stacked such that the conductors to become the coil conductors 10, 11, 12, 13, 14, and 15, the first connecting conductor 16, and the second connecting conductor 17 overlap in the stacking direction.

Subsequently, the multilayer body of the green sheets is cut into chips of a predetermined size with a cutting machine to obtain green chips. Subsequently, after removing the binder resin contained in each portion from the green chip, the green chip is fired. As a result, the element body 2 is obtained.

Subsequently, a second conductive paste is provided with respect to each of the sides of the pair of end surfaces 2*a* and 2*b* of the element body 2. The second conductive paste is prepared by mixing, for example, a conductive metal powder, glass frit, and a binder resin. Subsequently, the second conductive paste is baked by heat treatment and the first electrode layers 40 and 50 are formed. As a result of the heat treatment, the glass layers 40G and 50G are deposited on a part of the surfaces of the first electrode layers 40 and 50.

Subsequently, a third conductive paste is provided on the first electrode layers 40 and 50. The third conductive paste is prepared by mixing a thermosetting resin with, for example, a conductive material and an organic solvent. The third conductive paste is provided so as not to cover the edges 40E and 50E of the first electrode layers 40 and 50. Subsequently, the third conductive paste is baked by heat treatment and the second electrode layers 41 and 51 are formed. Finally, the surfaces of the first electrode layers 40 and 50 and the second electrode layers 41 and 51 are plated to form the first plating layers 42 and 52 and the second plating layers 43 and 53. The multilayer coil component 1 is obtained as a result of the above steps.

As described above, in the multilayer coil component 1 according to the present embodiment, the first plating layers 42 and 52 and the second plating layers 43 and 53 are disposed so as to be scattered in a plurality of places on the edges 40E and 50E of the first electrode layers 40 and 50. In this manner, in the multilayer coil component 1, the first plating layers 42 and 52 and the second plating layers 43 and 53 are disposed so as to be scattered in a plurality of places not at the edges 40E and 50E of the first electrode layers 40 and 50 as a whole but on the edges 40E and 50E of the first electrode layers 40 and 50, and thus the stress that is generated when the first plating layers 42 and 52 and the second plating layers 43 and 53 are formed can be dispersed. Accordingly, in the multilayer coil component 1, the first electrode layers 40 and 50 peeling off the element body 2 can be suppressed. Accordingly, in the multilayer coil component 1, peeling of the first external electrode 4 and the second external electrode 5 can be suppressed.

In the multilayer coil component 1 according to the present embodiment, the first external electrode 4 has the second electrode layer 41 disposed on the first electrode layer 40 and the second external electrode 5 has the second electrode layer 41 disposed on the first electrode layer 50. The second electrode layers 41 and 51 contain a resin and are not disposed at the edges 40E and 50E of the first electrode layers 40 and 50. The first plating layers 42 and 52 and the second plating layers 43 and 53 are disposed on the first electrode layers 40 and 50 and the second electrode layers 41 and 51. In this configuration, the edges 40E and 50E of the first electrode layers 40 and 50 are not covered with the second electrode layers 41 and 51, and thus the first plating layers 42 and 52 and the second plating layers 43 and 53 are disposed so as to be scattered in a plurality of places on the edges 40E and 50E of the first electrode layers 40 and 50. Accordingly, the first electrode layers 40 and 50 peeling off the element body 2 can be suppressed. In addition, the second electrode layers 41 and 51 contain a resin. As a result, in the second electrode layers 41 and 51, the stress in forming the first plating layers 42 and 52 and the second plating layers 43 and 53 can be mitigated. Accordingly, it is possible to suppress the second electrode layers 41 and 51 peeling off the first electrode layers 40 and 50 due to the stress in forming the first plating layers 42 and 52 and the second plating layers 43 and 53.

Although an embodiment of the present invention has been described above, the present invention is not necessarily limited to the above embodiment and various modifications can be made without departing from the gist thereof.

The element body 2 does not necessarily have to be configured to contain metal magnetic particles and may be configured by ferrite (such as Ni—Cu—Zn-based ferrite, Ni—Cu—Zn—Mg-based ferrite, and Cu—Zn-based ferrite), a dielectric material, or the like.

In the above embodiment, a form in which the first external electrode 4 has the first electrode part 4*a*, the second electrode part 4*b*, the third electrode part 4*c*, the fourth electrode part 4*d*, and the fifth electrode part 4*e* has been described as an example. However, the first external electrode 4 may have only the first electrode part 4*a* or only the second electrode part 4*b*. Likewise, the second external electrode 5 may have only the first electrode part 5*a* or only the second electrode part 5*b*. Various shapes can be adopted for the first external electrode 4 and the second external electrode 5.

In the above embodiment, a form in which the first external electrode 4 has the first electrode layer 40 and the second electrode layer 41 has been described as an example. However, the first external electrode may lack the second electrode layer. The same applies to the second external electrode.

In the above embodiment, a form in which the second electrode layers 41 and 51 are conductive resin layers has been described as an example. However, the second electrode layers 41 and 51 may not be conductive resin layers. In this case, it is preferable that the second electrode layer has no glass component (glass layer) on the surface as compared with the first electrode layer. In this configuration, a plating layer can be continuously and uniformly formed on the second electrode layer.

In the above embodiment, a form in which the first plating layers 42 and 52 and the second plating layers 43 and 53 are provided as plating layers has been described as an example. However, the plating layer may be one layer or three layers.

The number of coil conductors is not limited to the value described above.

What is claimed is:

1. A coil component comprising:
an element body;
a coil disposed in the element body; and
an external electrode at each of opposite ends of the element body, the external electrode disposed on a surface of the element body, wherein the external electrode further comprises:
a first electrode layer disposed on the surface of the element body,
a second electrode layer that is disposed on the first electrode layer, wherein the second electrode layer is not disposed on an edge of the first electrode layer, and
a plating layer disposed so as to cover a part of the first electrode layer and the second electrode layer,
wherein the plating layer is disposed so as to be scattered in a plurality of places on the edge of the first electrode layer at which the second electrode layer is not disposed.

2. The coil component according to claim 1, wherein
the second electrode layer contains a resin, and
the plating layer is disposed on the first electrode layer and the second electrode layer.

3. The coil component according to claim 1, wherein
the second electrode layer has no glass component on a surface as compared with the first electrode layer, and
the plating layer is disposed on the first electrode layer and the second electrode layer.

4. The coil component according to claim 1, wherein the element body is configured by stacking a magnetic body layer containing a plurality of metal magnetic particles of a soft magnetic material.

5. A method for manufacturing a coil component including an element body, a coil disposed in the element body, and an external electrode at each of opposite ends of the element body, the external electrode disposed on a surface of the element body, the method comprising:

disposing a first electrode of the external electrode on the surface of the element body;

disposing a second electrode layer of the external electrode on the first electrode layer such that the second electrode layer is not disposed on an edge of the first electrode layer; and disposing a plating layer so as to cover a part of the first electrode layer and the second electrode layer, wherein the plating layer is disposed so as to be scattered in a plurality of places on the edge of the first electrode layer at which the second electrode layer is not disposed.

* * * * *